(12) United States Patent
Arai et al.

(10) Patent No.: US 12,520,287 B2
(45) Date of Patent: Jan. 6, 2026

(54) BASE STATION AND STORAGE MEDIUM

(71) Applicant: KABUSHIKI KAISHA TOSHIBA, Tokyo (JP)

(72) Inventors: Kabuto Arai, Kawasaki Kanagawa (JP); Toshihisa Nabetani, Kawasaki Kanagawa (JP); Haruka Obata, Ota Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 380 days.

(21) Appl. No.: 18/172,351

(22) Filed: Feb. 22, 2023

(65) Prior Publication Data
US 2023/0413245 A1    Dec. 21, 2023

(30) Foreign Application Priority Data
Jun. 21, 2022    (JP) .................................. 2022-099684

(51) Int. Cl.
*H04W 72/0446*    (2023.01)
*H04W 72/563*    (2023.01)

(52) U.S. Cl.
CPC ..... *H04W 72/0446* (2013.01); *H04W 72/563* (2023.01)

(58) Field of Classification Search
CPC ............... H04W 28/02; H04W 72/563; H04W 72/0446
See application file for complete search history.

(56) References Cited

U.S. PATENT DOCUMENTS

| | | | |
|---|---|---|---|
| 11,659,444 B1 * | 5/2023 | Xing ..................... | H04W 24/02 370/235 |
| 12,089,249 B2 * | 9/2024 | Zhang ............... | H04W 72/1273 |
| 2002/0154600 A1 | 10/2002 | Ido et al. | |
| 2017/0192332 A1 | 7/2017 | Roudebush et al. | |
| 2020/0037196 A1 * | 1/2020 | Iwai ...................... | H04W 28/16 |
| 2020/0107339 A1 * | 4/2020 | Prakash ................ | H04L 47/283 |

(Continued)

FOREIGN PATENT DOCUMENTS

| | | | | |
|---|---|---|---|---|
| CN | 116830690 A | * | 9/2023 | ............ H04J 3/0667 |
| CN | 117501645 A | * | 2/2024 | .......... H04W 72/566 |

(Continued)

OTHER PUBLICATIONS

ETSI, "5G; System architecture for the 5G System (5GS)", ETSI, 3GPP TS 23.501 version 16.6.0 Release 16), ETSI TS 123 501 V16.6.0, Oct. 2020, pp. 1-449.

(Continued)

*Primary Examiner* — Eric Nowlin
(74) *Attorney, Agent, or Firm* — Holtz, Holtz & Volek PC (57) ABSTRACT

According to one embodiment, a base station includes a communication circuit and a controller. The communication circuit receives and transmits uplink data and downlink data. The controller calculates a downlink remaining time based on a first time when the communication circuit receives a resource allocation request, a second time when the communication circuit receives the uplink data, a third time when the communication circuit receives the downlink data, and a round-trip delay threshold time, and determines a fourth time when the communication circuit will transmit the downlink data to the terminal based on the downlink remaining time.

15 Claims, 11 Drawing Sheets

| 5QI value | Resource type | Default priority level | Packet delay budget (ms) | Packet error rate | Default maximum data burst volume (bytes) | Default averaging window (ms) | Example services |
|---|---|---|---|---|---|---|---|
| 1 | GBR | 20 | 100 | $10^{-2}$ | N/A | 2000 | Conversational voice |
| 2 | | 40 | 150 | $10^{-3}$ | N/A | 2000 | Conversational voice (Live streaming) |
| 5 | Non-GBR | 10 | 100 | $10^{-6}$ | N/A | N/A | IMS signaling |
| 6 | | 60 | 300 | $10^{-6}$ | N/A | N/A | Video (Buffered streaming) |
| 82 | Delay critical GBR | 19 | 10 | $10^{-4}$ | 255 | 2000 | Discrete automation |
| 83 | | 22 | 10 | $10^{-4}$ | 1354 | 2000 | Discrete automation |

(56) References Cited

U.S. PATENT DOCUMENTS

| | | | | |
|---|---|---|---|---|
| 2022/0386163 A1* | 12/2022 | Hande | ................... | H04W 28/18 |
| 2022/0417955 A1* | 12/2022 | Zhang | ................... | H04L 1/0003 |
| 2023/0388036 A1* | 11/2023 | Li | ....................... | H04W 56/001 |
| 2024/0113987 A1* | 4/2024 | Dong | .................... | H04L 47/801 |
| 2024/0154908 A1* | 5/2024 | Ma | ...................... | H04L 43/0858 |
| 2024/0397547 A1* | 11/2024 | Zhang | ....................... | H04L 5/14 |
| 2025/0016598 A1* | 1/2025 | Liu | ....................... | H04W 24/08 |

FOREIGN PATENT DOCUMENTS

| | | | | |
|---|---|---|---|---|
| JP | 2002084338 A | 3/2002 | | |
| JP | 2019504333 A | 2/2019 | | |
| JP | WO2018163556 A1 | 1/2020 | | |
| WO | 2018163556 A1 | 9/2018 | | |
| WO | WO-2018221953 A1 * | 12/2018 | .......... | H04W 72/044 |
| WO | WO-2022165730 A1 * | 8/2022 | ............ | H04J 3/0667 |
| WO | WO-2022271411 A1 * | 12/2022 | .......... | H04W 72/046 |

OTHER PUBLICATIONS

Japanese Decision to Grant a Patent (and an English language translation thereof) dated Jul. 1, 2025, issued in counterpart Japanese Application No. 2022-099684.

* cited by examiner

| 5QI value | Resource type | Default priority level | Packet delay budget (ms) | Packet error rate | Default maximum data burst volume (bytes) | Default averaging window (ms) | Example services |
|---|---|---|---|---|---|---|---|
| 1 | GBR | 20 | 100 | $10^{-2}$ | N/A | 2000 | Conversational voice |
| 2 | GBR | 40 | 150 | $10^{-3}$ | N/A | 2000 | Conversational voice (Live streaming) |
| 5 | Non-GBR | 10 | 100 | $10^{-6}$ | N/A | N/A | IMS signaling |
| 6 | Non-GBR | 60 | 300 | $10^{-6}$ | N/A | N/A | Video (Buffered streaming) |
| 82 | Delay critical GBR | 19 | 10 | $10^{-4}$ | 255 | 2000 | Discrete automation |
| 83 | Delay critical GBR | 22 | 10 | $10^{-4}$ | 1354 | 2000 | Discrete automation |

BASE STATION AND STORAGE MEDIUM

CROSS-REFERENCE TO RELATED APPLICATIONS

This application is based upon and claims the benefit of priority from Japanese Patent Application No. 2022-099684, filed Jun. 21, 2022, the entire contents of which are incorporated herein by reference.

FIELD

Embodiments described herein relate generally to a base station and a storage medium.

BACKGROUND

A delay threshold time is one of indices indicating performance of terminal-to-terminal communication via a base station (end-to-end communication). The delay threshold time is a maximum value or an allowable value of a time from the start to the end of the end-to-end communication. A communication priority of a terminal is determined so that the end-to-end communication will be completed within the delay threshold time. A communication resource is allocated to the terminal in descending order of the communication priority.

Round-trip communication is an example of the end-to-end communication. In the round-trip communication, a terminal (or a server) transmits data to a server (or a terminal), the server (or the terminal) generates transmission data based on the received data, and the server (or the terminal) transmits the transmission data to the terminal (or the server).

Conventionally, a delay threshold time in round-trip communication is determined from a history of past communication. The timing for the generation of the transmission data based on the received data and the size of the transmission data are not known until the transmission data is generated. Therefore, if the communication priority of the terminal is determined based on the predetermined delay threshold time, the round-trip communication may not be completed within the predetermined delay threshold time.

DETAILED DESCRIPTION

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, a base station comprises a communication circuit and a controller. The communication circuit is configured to receive uplink data from a terminal, transmit the uplink data to a server, receive downlink data generated by the server based on the uplink data, and transmit the downlink data to the terminal. The controller is configured to calculate a downlink remaining time until an end timing of a downlink delay threshold time based on a first time when the communication circuit receives a communication resource allocation request, a second time when the communication circuit receives the uplink data, a third time when the communication circuit receives the downlink data, and a round-trip delay threshold time, and determine a fourth time when the communication circuit will transmit the downlink data to the terminal based on the downlink remaining time.

Third Generation Partnership Project (3GPP (registered trademark)) proposes the 5th generation mobile communication system (5G). In 5G, services having various requirements are expected to be provided in a mixed manner. Examples of the requirements are high speed and large capacity, multiple simultaneous connections, and high reliability and ultra-low latency. Efficient utilization of a communication resource is important to satisfy these diverse requirements. Examples of the communication resource include, frequency, time, space, power, code, and orbital angular momentum. The communication resource is typically controlled by a base station. The base station dynamically determines a communication resource to be allocated to a terminal in response to various requests generated by the terminal during uplink communication and downlink communication between the terminal and the base station.

An Earliest Deadline First (EDF) method is a communication resource allocation method intended to realize low-latency requirements. In the EDF method, a remaining time until the expiration of the delay threshold time is calculated by subtracting a data waiting time, which is a delay time in a buffer in the base station, from the delay threshold time set for each terminal. The communication resource is preferentially allocated to a terminal having a shorter remaining time. The delay threshold time is set based on the type of an application providing a service used by the terminal.

In 5G, a Quality of Service (QoS) flow is created based on the type of the application. The QoS flow is identified by a QoS Flow Indicator (QFI). In 5G, a 5QI (5G QoS Indicator) is available as a default QFI.

Figure 1:
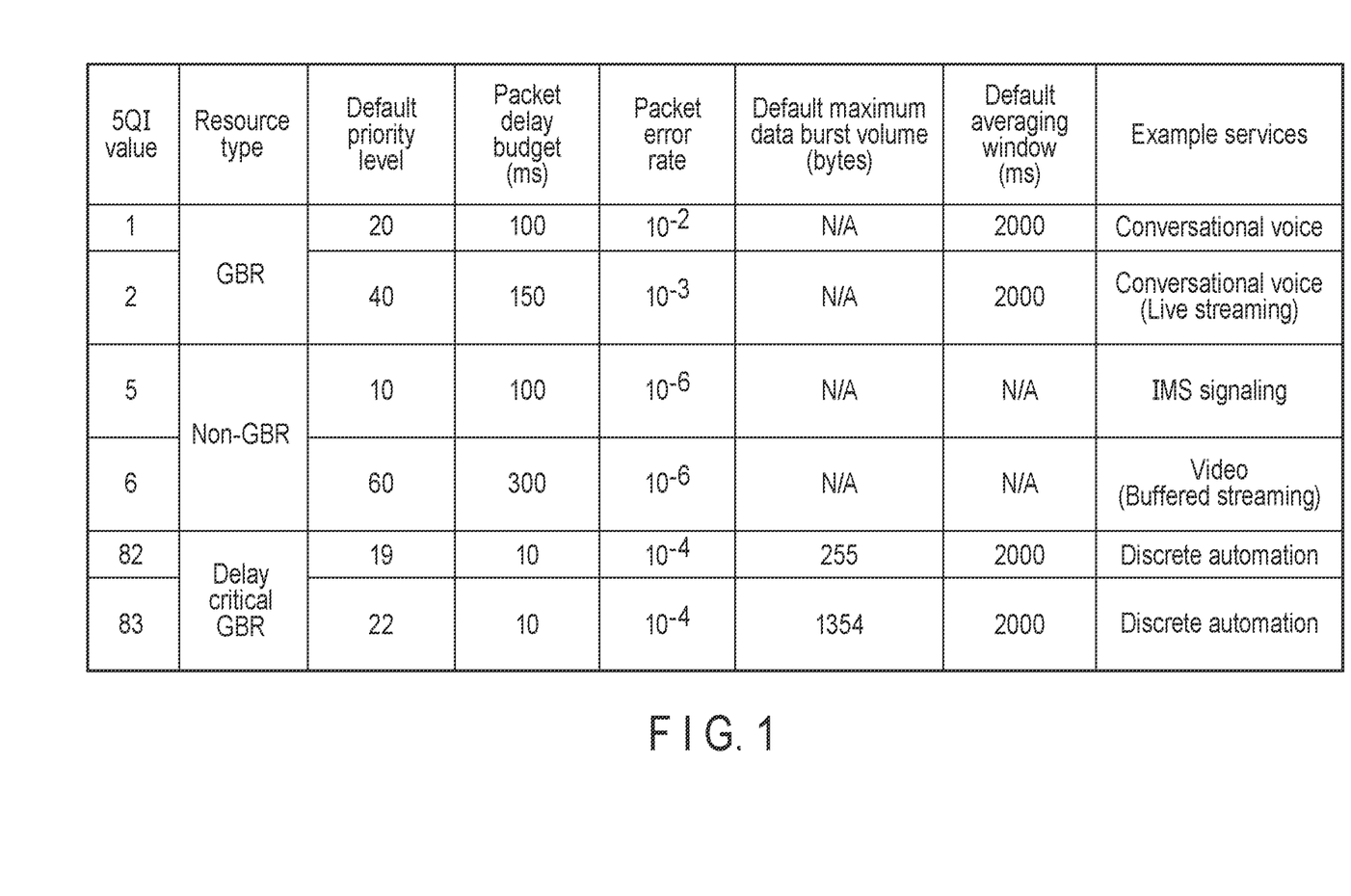
FIG. 1 is a diagram for describing an example of a mapping table between 5QIs and QoS characteristics according to a first embodiment.

FIG. 1 is a diagram for describing an example of a mapping table between 5QIs and QoS characteristics used when a base station according to a first embodiment sets the delay threshold time. Various uplink delay threshold times and downlink delay threshold times are set for each 5QI value. When the EDF method is applied as the communication resource allocation method, a packet delay budget (delay threshold time) set based on the 5QI value is used. When communication between the base station and the terminal using the service provided by the application is established, the delay threshold time corresponding to the application executed by the terminal is set in the base station. For example, in a certain application, a delay threshold time of 100 msec with a 5QI value of 1 is set as the uplink delay threshold time, and a delay threshold time of 100 msec with a 5QI value of 5 is set as the downlink delay threshold time. A packet error rate is an allowable upper limit value of a packet loss rate. The packet error rate of 1% means that a packet loss up to 1% is allowed. A default maximum data burst volume is the maximum value of a data size to be processed within the delay threshold time. A default averaging window is a time interval used to calculate a Guaranteed Flow Bit Rate (GFBR) for the QoS flow whose resource type is GBR.

The QoS flow whose resource type is the GBR is a QoS flow whose bit rate is guaranteed. The QoS flow whose resource type is Non-GBR is a QoS flow whose bit rate is not guaranteed. The QoS flow whose resource type is a delay critical GBR is a QoS flow that ensures low delay and high reliability. The low delay and high reliability means a small delay threshold and a small packet error rate.

One of services expected to be provided in 5G is control of industrial robotics such as an unmanned aerial vehicle (UAV) and an automatic guided vehicle (AGV). A device subject to control such as the UAV or the AGV includes a sensor. The device subject to control transmits sensor information to the base station in the uplink. The base station transmits the sensor information to a server. The server generates a control signal for controlling the device subject to control based on the sensor information, and transmits the control signal to the base station. The base station transmits the control signal to the device subject to control in the downlink. That is, the device subject to control is feedback-controlled.

In a case where such feedback control is applied, it is necessary to reduce a delay in a round-trip path including the uplink and the downlink. To reduce the delay in the round-trip path, the EDF methods may be individually applied to the uplink and the downlink.

If the uplink delay threshold time and the downlink delay threshold time are determined in advance based on the 5QI value, the round-trip delay threshold time cannot be dynamically changed based on a delay status of data transmitted in the round-trip path. For example, in an application using a round-trip path in which the reception of uplink data serves as a trigger and downlink data is newly generated, the downlink delay threshold time cannot be dynamically changed in consideration of a time consumed in the uplink and a processing time in the application.

In addition, the delay time of the round-trip path includes an uplink delay time, a downlink delay time, and an application processing time (application delay time). The application delay time depends on the application used by the terminal and different for each terminal.

Therefore, considering the application processing delay time for each terminal when determining the communication priority of the downlink to the terminal or the uplink from the terminal is effective from the viewpoint of efficient utilization of the communication resource to satisfy the requirements for the downlink delay threshold time.

The following describes some embodiments of dynamically changing the round-trip delay threshold time for low latency on the round-trip path.

First Embodiment

Figure 2A:
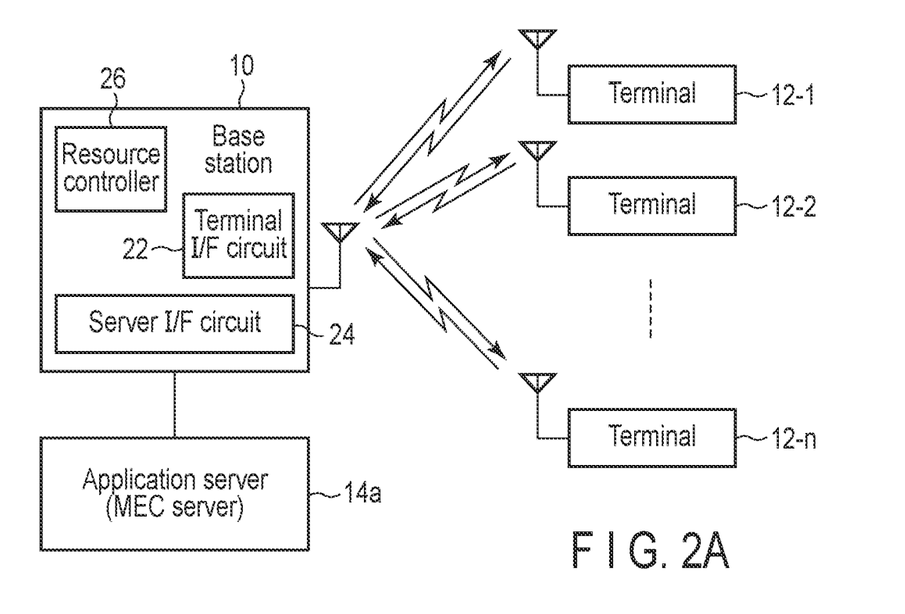
FIG. 2A is a block diagram for describing an example of a communication system according to the first embodiment.
Figure 2B:
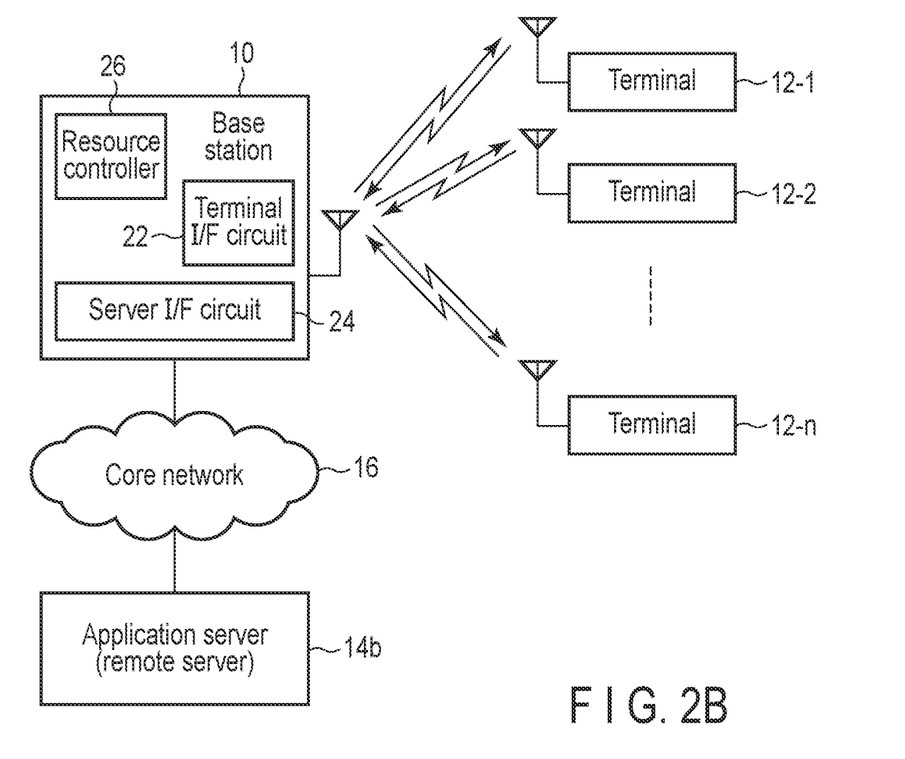
FIG. 2B is a block diagram for describing another example of a communication system according to the first embodiment.

FIGS. 2A and 2B are block diagrams for respectively describing examples of a communication system including a base station 10 according to a first embodiment.

A plurality of terminals 12-1, 12-2, . . . 12-n are connected to the base station 10. In this specification, any one of the terminals 12-1, 12-2, . . . 12-n may be referred to as a terminal 12. The base station 10 is connected to an application server 14a or 14b. In this specification, any one of the application servers 14a and 14b may be referred to as an application server 14. The terminal 12 can execute an application stored in the terminal 12.

FIG. 2A illustrates a system that utilizes a Mobile Edge Computing (MEC) server 14a installed near the base station 10 as the application server 14.

FIG. 2B illustrates a system that uses, as the application server 14, a remote server 14b that is connected to the base station 10 via a core network 16, The remote server 14b exists at a position physically away from the base station 10.

The base station 10 includes a terminal interface circuit (terminal I/F circuit) 22 for communicating with the terminal 12, a server interface circuit (server I/F circuit) 24 for communicating with the application server 14, and a resource controller 26. The resource controller 26 stores the 5QI/QoS mapping table illustrated in FIG. 1. The resource controller 26 determines a communication resource to be allocated to the terminal 12. The base station 10 communicates with the terminal 12 using the communication resource allocated by the resource controller 26.

The resource controller 26 illustrated in FIGS. 2A and 2B is implemented by dedicated hardware. The resource controller 26 may be implemented by a processor (CPU) that executes a program.

Figure 3:
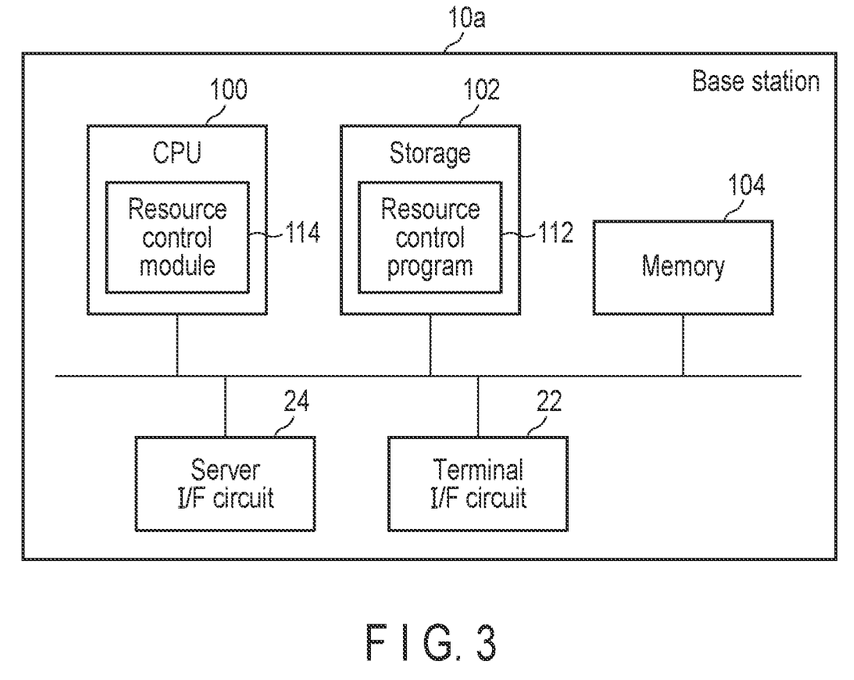
FIG. 3 is a block diagram for describing example of a base station according to the first embodiment.

FIG. 3 is a block diagram for describing another example of a base station 10a according to the first embodiment. The base station 10a includes the terminal I/F circuit 22, the server I/F circuit 24, a CPU 100, a storage 102, and a memory 104. The storage 102 is a non-transitory computer-readable storage medium storing an application executed by the CPU 100. An example of the application is a resource control program 112. Examples of the storage 102 are a hard disk and an SSD (solid state drive). The CPU 100 reads the application from the storage 102, writes the application into the memory 104, and executes the application stored in the memory 104. Examples of the memory 104 are a DRAM and an SRAM. The CPU 100 implements a resource control module 114 by executing the resource control program 112. The resource control module 114 corresponds to the resource controller 26.

Figure 4:
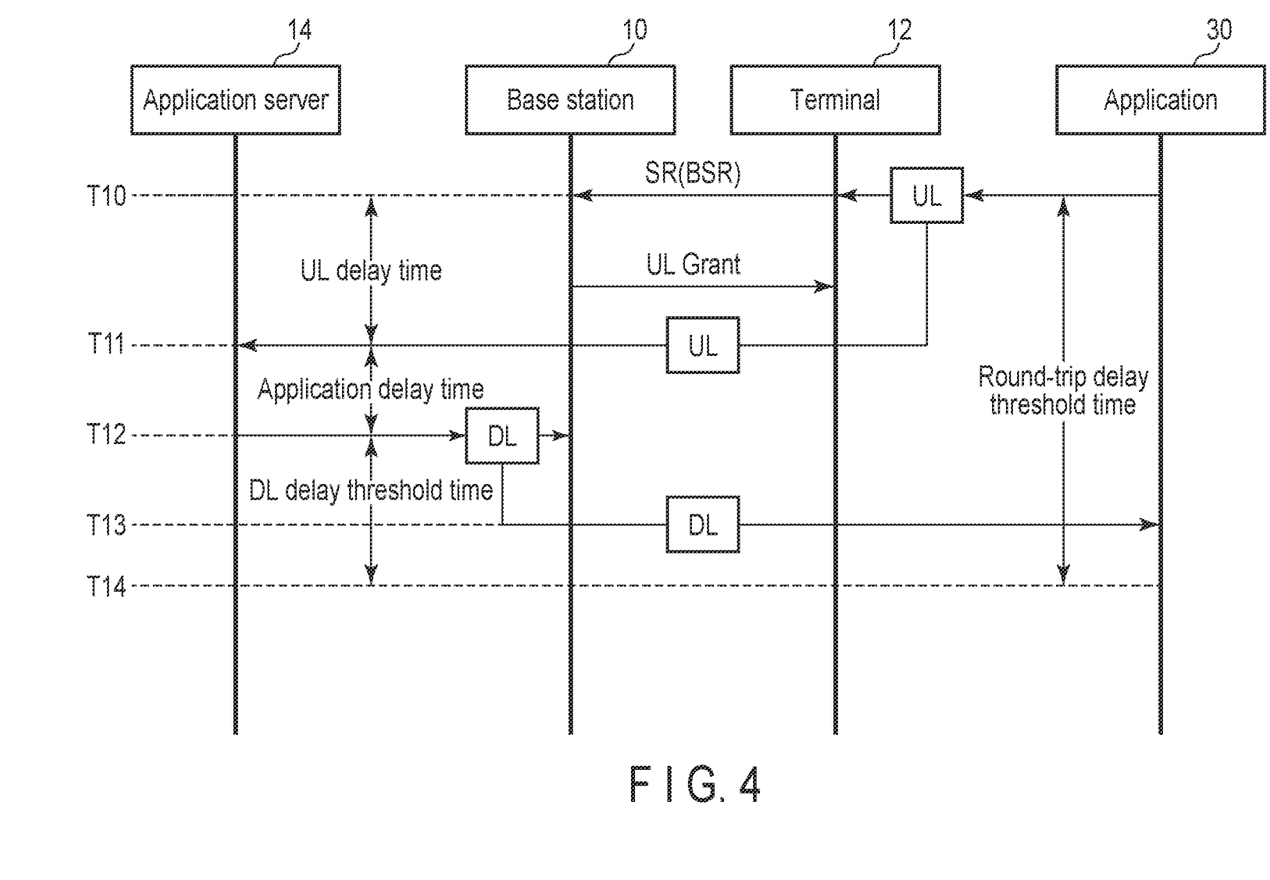
FIG. 4 is a diagram for describing an example of a first round-trip communication according to the first embodiment.

FIG. 4 is a diagram for describing an example of a first round-trip communication by the communication system including the base station 10 according to the first embodiment.

In the first round-trip communication, the terminal 12 transmits uplink data UL to the base station 10, the base station 10 transmits the uplink data UL to the application server 14, the application server 14 newly generates downlink data DL based on the uplink data UL, the application server 14 transmits the downlink data DL to the base station 10, and the base station 10 transmits the downlink data DL to the terminal 12.

The terminal 12 stores an application 30 and executes the application 30. It is assumed that the application 30 executed by the terminal 12 is an application requiring the first round-trip communication. The application 30 generates the uplink data UL to be transmitted to the application server 14. An example of the uplink data UL is sensor information generated by a device subject to control of industrial robotics.

When the application 30 generates the uplink data UL, the terminal 12 transmits a scheduling request (SR) signal or a buffer status report (BSR) signal to the base station 10. The SR signal or the BSR signal is a signal for requesting the base station 10 for communication resource allocation to allow the terminal 12 to perform uplink transmission. Hereinafter, the SR signal and the BSR signal are referred to as the SR signal.

The base station 10 receives the SR signal at a timing T10. The base station 10 establishes communication with the terminal 12 before the timing T10, and the uplink delay threshold time and the downlink delay threshold time of the terminal 12 are set in the base station 10.

The resource controller 26 determines the uplink communication priority of the terminal 12 according to an uplink communication resource allocation method. As the uplink communication resource allocation method, the EDF allocation method may be used. When the EDF allocation method is used, the resource controller 26 calculates, at a certain timing, a remaining time until the end timing of the uplink delay threshold time for all terminals 12 for which the round-trip communication is not completed. The remaining time is calculated by subtracting the elapsed time from the timing T10 from the uplink delay threshold time set for each of the plurality of terminals 12 connected to the base station 10 at the certain timing. The resource controller 26 allocates a higher uplink communication priority to a terminal 12 having a shorter remaining time. The shortness of the remaining time and the height of the uplink communication priority are proportional. The terminal 12 having the shortest remaining time has the highest uplink communication priority.

The resource controller 26 allocates the communication resource in order from a terminal 12 having a higher uplink communication priority. The resource controller 26 determines uplink transmission timings T11 of all terminals 12 for which the round-trip communication is not completed. The base station transmits a communication resource allocation signal UL Grant including information indicating the timing T11 to each terminal 12.

The terminal 12 that has received the signal UL-Grant transmits the uplink data UL to the base station 10 at the timing T11 determined by the base station 10. The difference between the timing T10 and the timing T11 is referred to as an uplink delay time (UL delay time).

The base station 10 receives the uplink data UL and transfers the uplink data UL to the application server 14.

The application server 14 processes the uplink data UL. The application server 14 newly generates the downlink data DL at a timing T12. An example of the downlink data DL is a control signal of the device subject to control of industrial robotics. The difference between the timing T11 and the timing T12 is referred to as an application delay time.

The base station 10 receives the downlink data DL from the application server 14.

The resource controller 26 determines the downlink communication priority of the terminal 12 according to a downlink communication resource allocation method. As the downlink communication resource allocation method, the EDF allocation method may be used. When the EDF allocation method is used, the resource controller 26 calculates the uplink delay time from the difference between the timing T10 and the timing T11. The resource controller 26 calculates the application delay time from the difference between the timing T11 and the timing T12. The resource controller 26 calculates, at the timing T12, a downlink remaining time by subtracting the sum of the uplink delay time and the application delay time from the round-trip delay threshold time set for each of the plurality of terminals 12 connected to the base station 10.

The uplink delay time and the application delay time are variable although the round-trip delay threshold time is a fixed time. The downlink delay threshold time varies depending on the uplink delay time and the application delay time. Due to this, the downlink delay threshold time (DL delay threshold time) set when communication with the terminal 12 is established is updated according to the downlink remaining time at the timing T12. That is, the downlink delay threshold time is dynamically changed.

The resource controller 26 allocates a higher downlink communication priority to a terminal 12 having a shorter downlink delay threshold time (downlink remaining time). The shortness of the downlink delay threshold time (downlink remaining time) and the height of the downlink communication priority are proportional. A terminal 12 having the shortest downlink delay threshold time (downlink remaining time) has the highest downlink communication priority.

The resource controller 26 allocates the communication resource in order from a terminal 12 having a higher downlink communication priority. The resource controller 26 determines a downlink transmission timing T13 of all terminals 12 for which the round-trip communication is not completed. The base station 10 transmits the downlink data to each terminal 12 at the timing T13.

According to the first embodiment, the base station 10 updates the downlink delay threshold time of all terminals 12 for which the round-trip communication is not completed based on the downlink remaining time when the base station 10 receives the downlink data DL from the application server 14. The base station 10 determines again the downlink transmission timing of each terminal 12. The base station 10 allocates the communication resource in order from a terminal 12 having a shorter updated downlink delay threshold time. Therefore, the downlink data DL is more likely to be transmitted to the terminal 12 before the downlink delay threshold time elapses from the timing T12, that is, before the round-trip delay threshold time elapses from the timing T10. The terminal 12 is more likely to receive the downlink data DL before the round-trip delay threshold time elapses after transmitting the communication resource allocation request. The time taken for the round-trip communication is less likely to exceed the round-trip delay threshold time, thus reducing a delay threshold time exceeding rate in the round-trip communication.

Second Embodiment

A base station and a communication system according to a second embodiment are the same as the base station and the communication system according to the first embodiment illustrated in FIGS. 2A, 2B, and 3, and thus drawings thereof are omitted.

Figure 5:
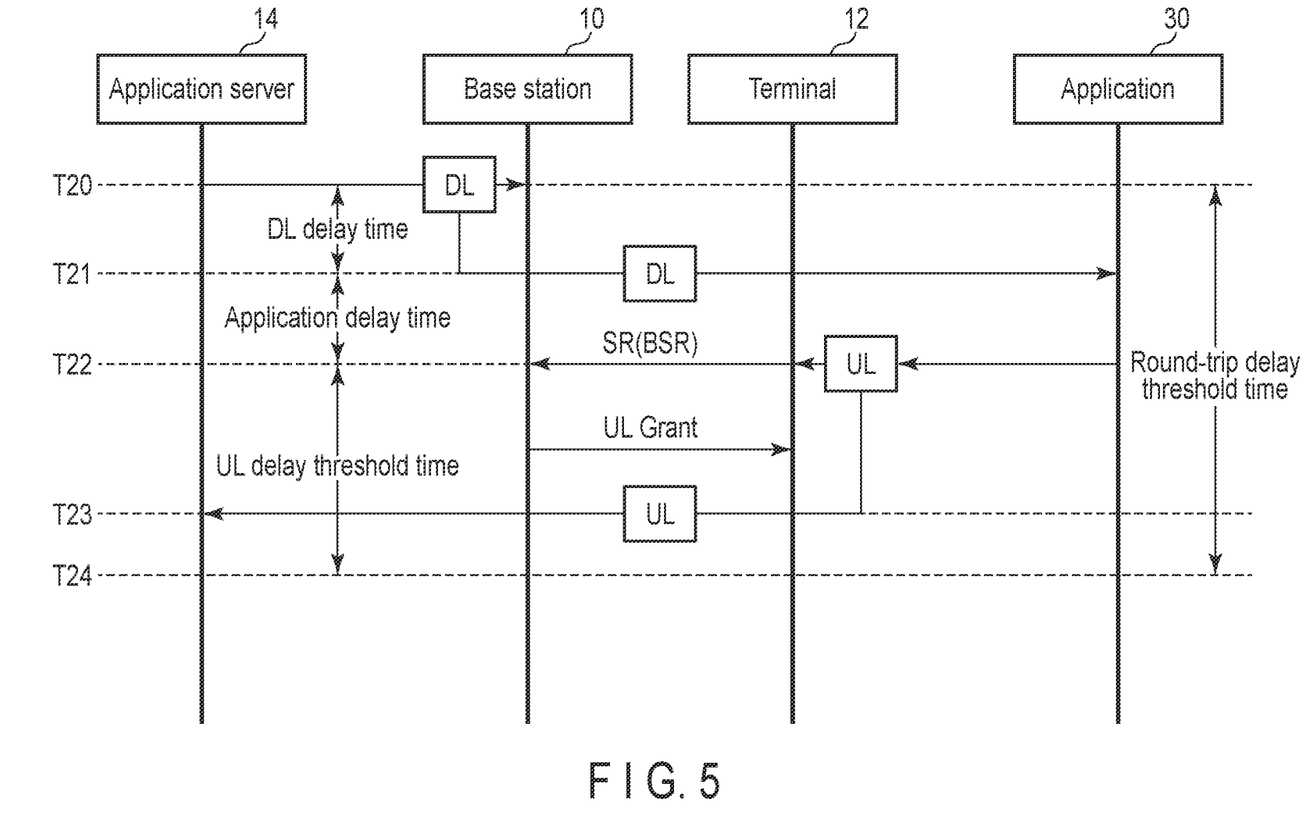
FIG. 5 is a diagram for describing an example of a second round-trip communication according to the second embodiment.

FIG. 5 is a diagram for describing an example of a second round-trip communication by the communication system including the base station 10 according to the second embodiment.

In the second round-trip communication, an application server 14 generates downlink data DL, the application server 14 transmits the downlink data DL to the base station 10, the base station 10 transmits the downlink data DL to a terminal 12, the terminal 12 newly generates uplink data UL based on the downlink data DL, the terminal 12 transmits the uplink data UL to the base station 10, and the base station 10 transmits the uplink data UL to the application server 14. An example of the second round-trip communication is executed in an IoT system. A large number of IoT devices are distributed. The application server 14 transmits the downlink data DL requesting the IoT devices for sensor information. IoT devices that have received the downlink data DL transmit the uplink data UL including the sensor information.

It is assumed that the application 30 executed by the terminal 12 is an application requiring the second round-trip communication. At a timing T20, the application server 14 generates the downlink data DL to be transmitted to the terminal 12. An example of the downlink data DL is a sensor information request signal for the IoT device.

The base station 10 establishes communication with the terminal 12 before the timing T20, and the uplink delay threshold time and the downlink delay threshold time of each terminal 12 are set in the base station 10.

The base station 10 receives the downlink data DL from the application server 14.

The resource controller 26 determines the downlink communication priority of the terminal 12 according to a downlink communication resource allocation method. As the downlink communication resource allocation method, the EDF allocation method may be used. When the EDF allocation method is used, the resource controller 26 calculates, at a certain timing, a remaining time until the end timing of the downlink delay threshold time for the terminals 12 for which the round-trip communication is not completed. The remaining time is calculated by subtracting the elapsed time from the timing T20 from the downlink delay threshold time set for each of the plurality of terminals 12 connected to the base station 10 at the certain timing. The resource controller 26 allocates a higher downlink communication priority to a terminal 12 having a shorter remaining time. The shortness of the remaining time and the height of the downlink communication priority are proportional. The terminal 12 having the shortest remaining time has the highest downlink communication priority.

The resource controller 26 allocates the communication resource in order from a terminal 12 having a higher downlink communication priority. The resource controller 26 determines a downlink transmission timing T21 of each terminal 12. The base station 10 transmits the downlink data to the terminal 12 at the timing T21. The difference between the timing T20 and the timing T21 is referred to as a downlink delay time (DL delay time).

The application 30 of the terminal 12 that has received the downlink data DL processes the downlink data DL. The application 30 newly generates the uplink data UL at a timing T22. An example of the uplink data UL is sensor information of the IoT device. The difference between the timing T21 and the timing T22 is referred to as an application delay time.

When the application 30 generates the uplink data UL, the terminal 12 transmits an SR signal to the base station 10.

The resource controller 26 determines the uplink communication priority of the terminal 12 according to an uplink communication resource allocation method. As the uplink communication resource allocation method, the EDF allocation method may be used. When the EDF allocation method is used, the resource controller 26 calculates the downlink delay time from the difference between the timing T20 and the timing T21. The resource controller 26 calculates the application delay time from the difference between the timing T21 and the timing T22. The resource controller 26 calculates, at the timing T22, an uplink remaining time by subtracting the sum of the downlink delay time and the application delay threshold time from the round-trip delay threshold time set for each of the plurality of terminals 12 connected to the base station 10.

The downlink delay time and the application delay time are variable although the round-trip delay threshold time is a fixed time. The uplink delay threshold time (UL delay threshold time) varies depending on the downlink delay time and the application delay time. Due to this, the uplink delay threshold time set when communication with the terminal 12 is established is updated according to the uplink remaining time at the timing T22. That is, the uplink delay threshold time is dynamically changed.

The resource controller 26 allocates a higher uplink communication priority to a terminal 12 having a shorter uplink delay threshold time (uplink remaining time). The shortness of the uplink delay threshold time (uplink remaining time) and the height of the uplink communication priority are proportional. A terminal 12 having the shortest uplink delay threshold time (uplink remaining time) has the highest uplink communication priority.

The resource controller 26 allocates the communication resource in order from a terminal 12 having a higher uplink communication priority. The resource controller 26 determines an uplink transmission timing T23 of each terminal 12. The base station 10 transmits a communication resource allocation signal UL Grant including information indicating the timing T23 to each terminal 12.

The terminal 12 that has received the signal UL-Grant transmits the uplink data UL to the base station 10 at the timing T23 determined by the base station 10.

The terminal 12 that has received the signal UL-Grant transmits the uplink data UL to the base station 10 at the timing T23 determined by the base station 10.

According to the second embodiment, the base station 10 updates the uplink delay threshold time of all terminals 12 for which the round-trip communication is not completed based on the uplink remaining time when the base station 10 receives the uplink data UL from a terminal 12. The base station 10 determines again the uplink transmission timing of each terminal 12. The base station 10 allocates the communication resource in order from a terminal 12 having a shorter updated uplink delay threshold time. Therefore, the uplink data UL is more likely to be transmitted to the base station 10 before the uplink delay threshold time elapses from the timing T22, that is, before the round-trip delay threshold time elapses from the timing T20. The base station 10 is more likely to receive the uplink data UL before the round-trip delay threshold time elapses after receiving the downlink data DL. The time taken for the round-trip communication is less likely to exceed the round-trip delay threshold time, thus reducing a delay threshold time exceeding rate in the round-trip communication.

Third Embodiment

Figure 6:
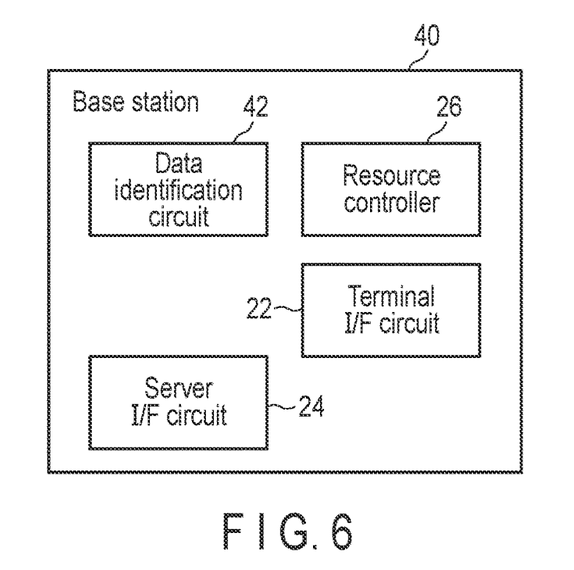
FIG. 6 is a block diagram for describing an example of a configuration of a base station according to a third embodiment.

FIG. 6 is a block diagram for describing an example of a configuration of a base station 40 according to a third embodiment.

The base station 40 includes the terminal I/F circuit 22, the server I/F circuit 24, the resource controller 26, and a data identification circuit 42. The base station 40 receives a plurality of uplink data transmitted from a plurality of terminals 12. The base station 40 receives a plurality of downlink data from the application server 14.

The data identification circuit 42 assigns an identifier to each of the plurality of uplink data UL. The identifier identifies the data and the terminal. An identifier may identify the data and the terminal. Two identifiers may respectively identify the data and the terminal.

The application server 14 processes the uplink data and generates the downlink data. The application server 14 assigns to the downlink data, the same identifier as the identifier assigned to the uplink data based on which the downlink data is generated.

The resource controller 26 and the data identification circuit 42 illustrated in FIG. 6 are implemented by a dedicated hardware. The resource controller 26 and the data identification device 42 may be implemented by a processor that executes a program.

Figure 7:
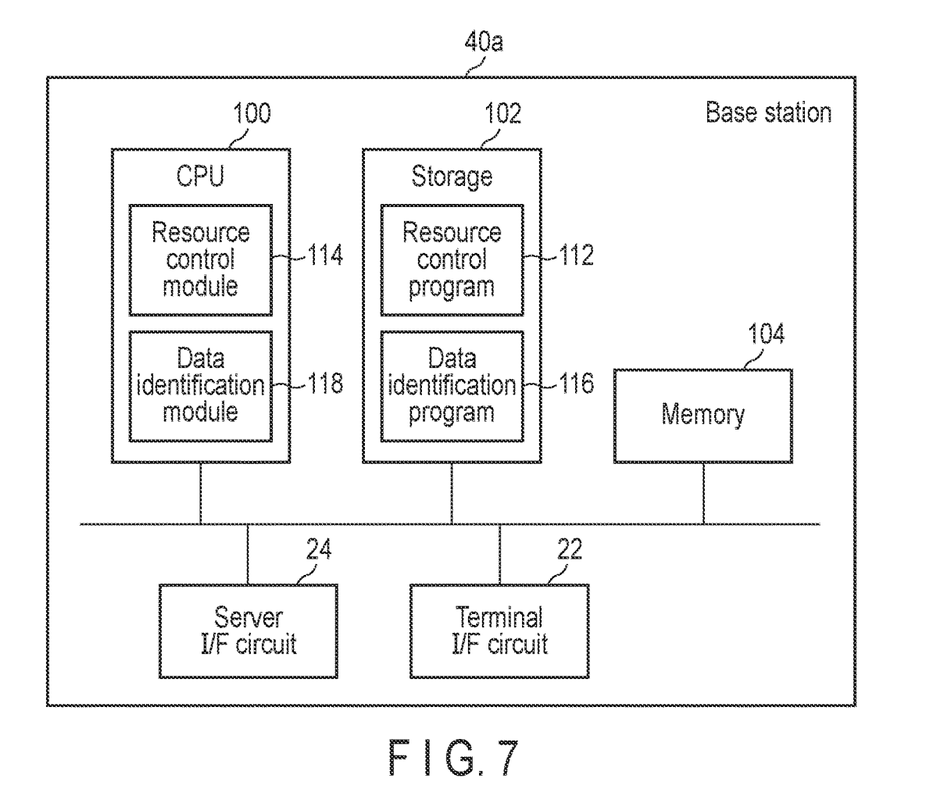
FIG. 7 is a block diagram for describing another example of a base station according to the third embodiment.

FIG. 7 is a block diagram for describing another example of a base station 40a according to the third embodiment. The base station 40a includes the terminal I/F circuit 22, the server I/F circuit 24, the CPU 100, the storage 102, and the memory 104. The storage 102 stores an application executed by the CPU 100. Examples of the application are the resource control program 112 and a data identification program 116. The CPU 100 implements the resource control module 114 by executing the resource control program 112. The resource control module 114 corresponds to the resource controller 26. The CPU 100 implements a data identification module 118 by executing the data identification program 116. The data identification module 118 corresponds to the data identification device 42.

Figure 8:
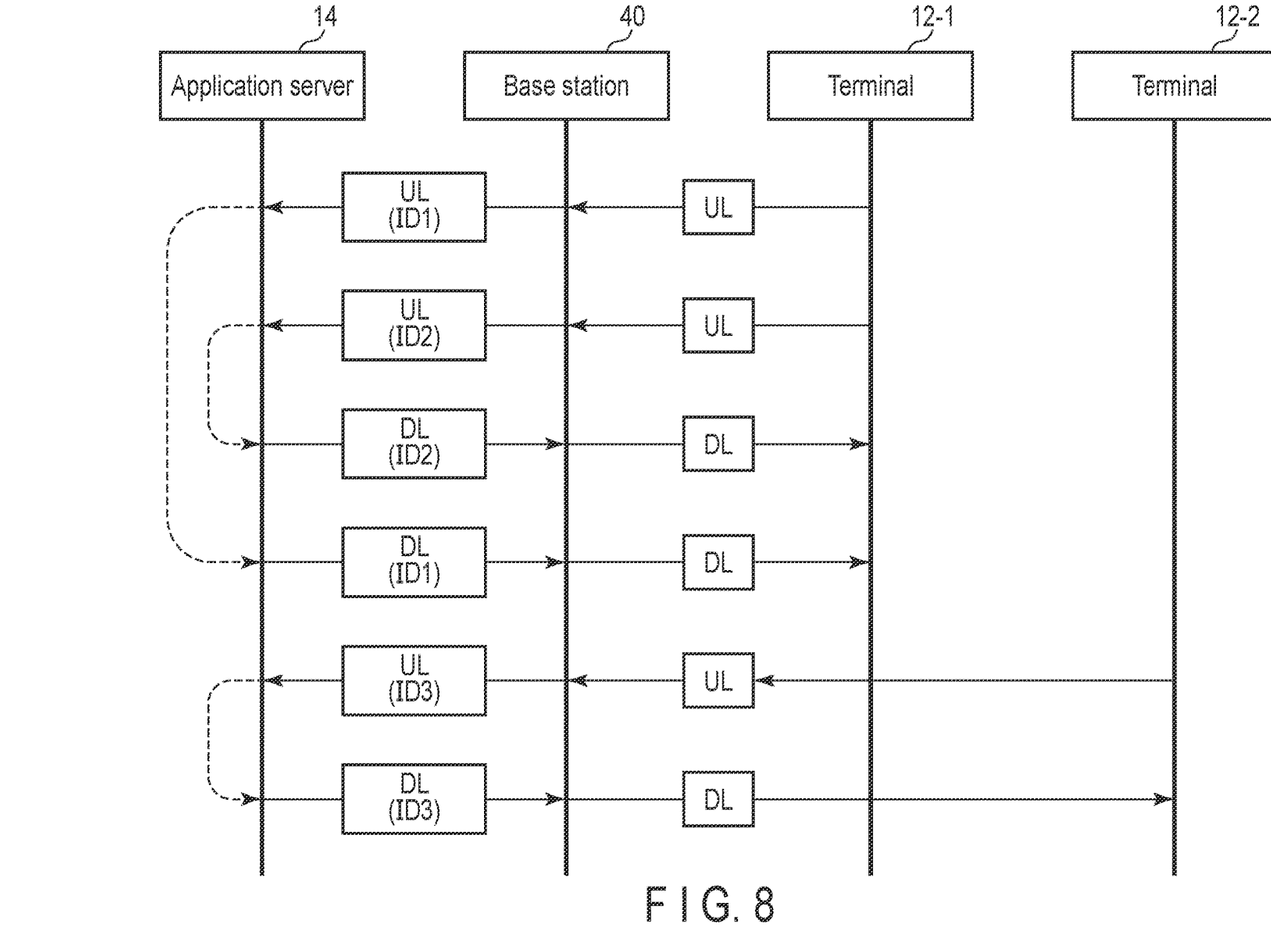
FIG. 8 is a diagram for describing an example of the first round-trip communication according to the third embodiment.

FIG. 8 is a diagram for describing an example of the first round-trip communication by the base station 40 according to the third embodiment.

The data identification circuit 42 assigns unique identifiers ID1 and ID2 to each of a plurality of (two in this example) uplink data UL received from the terminal 12-1. The data identification circuit 42 transfers the uplink data UL and the assigned identifiers ID1 and ID2 to the application server 14 at the timing T11 (FIG. 4). Each of the identifiers ID1 and ID2 identifies the data and the terminal 12-1.

The data identification circuit 42 assigns a unique identifier ID3 to uplink data UL received from the terminal 12-2. The data identification circuit 42 transfers the uplink data UL and the assigned identifier ID3 to the application server 14 at the timing T11. The identifier ID3 identifies the data and the terminal 12-2.

The application server 14 assigns the same identifier as the identifier assigned to the uplink data to the downlink data DL newly generated by processing the uplink data UL. The application server 14 transmits the downlink data DL and the identifier ID to the base station 10 at the timing T12 (FIG. 4).

The data identification circuit 42 associates uplink data and downlink data having the same identifier with one round-trip communication.

Figure 9:
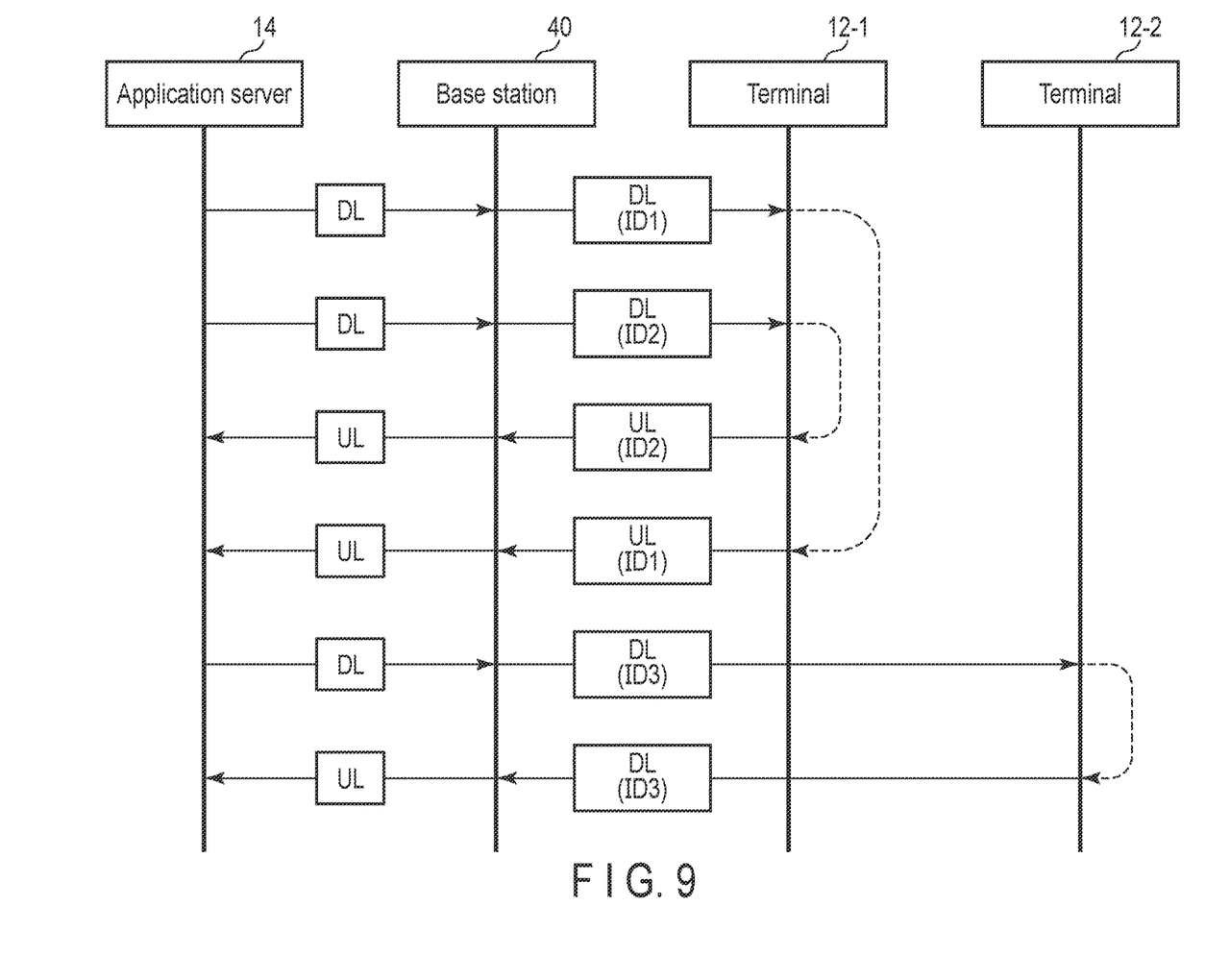
FIG. 9 is a diagram for describing an example of the second round-trip communication according to the third embodiment.

FIG. 9 is a diagram for describing an example of the second round-trip communication by the base station 40 according to the third embodiment.

The data identification circuit 42 assigns unique identifiers ID1, ID2, and ID3 to each of a plurality of (three in this example) downlink data DL received from the application server 14. The data identification circuit 42 transfers the downlink data DL and the assigned identifiers ID1, ID2, and ID3 to the terminals 12-1 and 12-2 at the timing T21 (FIG. 5). Each of the identifiers ID1 and ID2 identifies the data and the terminal 12-1. The identifier ID3 identifies the data and the terminal 12-2.

The terminals 12-1 and 12-2 assign the same identifier as the identifier assigned to the downlink data to the uplink data UL newly generated by processing the downlink data DL. The terminals 12-1 and 12-2 transmit the uplink data UL and the identifier ID to the base station 10 at the timing T23 (FIG. 5).

The data identification circuit 42 associates uplink data and downlink data having the same identifier with one round-trip communication.

According to the third embodiment, the base station 40 associates the uplink data UL and the downlink data DL based on the identifier. The base station 40 transmits downlink data DL having the same identifier as the uplink data UL to the terminal 12 that has transmitted the uplink data UL. Therefore, even if there are a plurality of uplink data UL and a plurality of downlink data DL, round-trip communication that satisfies the delay threshold time requirement is implemented by corresponding uplink data UL and downlink data DL.

Fourth Embodiment

A base station and a communication system according to a fourth embodiment are the same as the base station 10 and the communication system according to the first embodiment illustrated in FIGS. 2A, 2B, and 3, and thus drawings thereof are omitted.

The resource controller 26 according to the first embodiment does not define processing in a case where the downlink transmission timing T13 is not within the downlink delay threshold time. For this reason, according to the first embodiment, downlink data DL is transmitted to the terminal 12 even when the downlink transmission timing T13 is after the end timing of the downlink delay threshold time, that is, after the end timing of the round-trip delay threshold time. Depending on the application 30, downlink data DL received after the end timing of the downlink delay threshold time may not be valuable. For example, in the case of an application such as video or audio data transmission focusing on real-time properties, there is a high possibility that data received after the end timing of the downlink delay threshold time is unnecessary.

In the fourth embodiment, processing executed by the resource controller 26 is determined in advance depending on whether or not the downlink transmission timing T13 is within the downlink delay threshold time.

Figure 10:
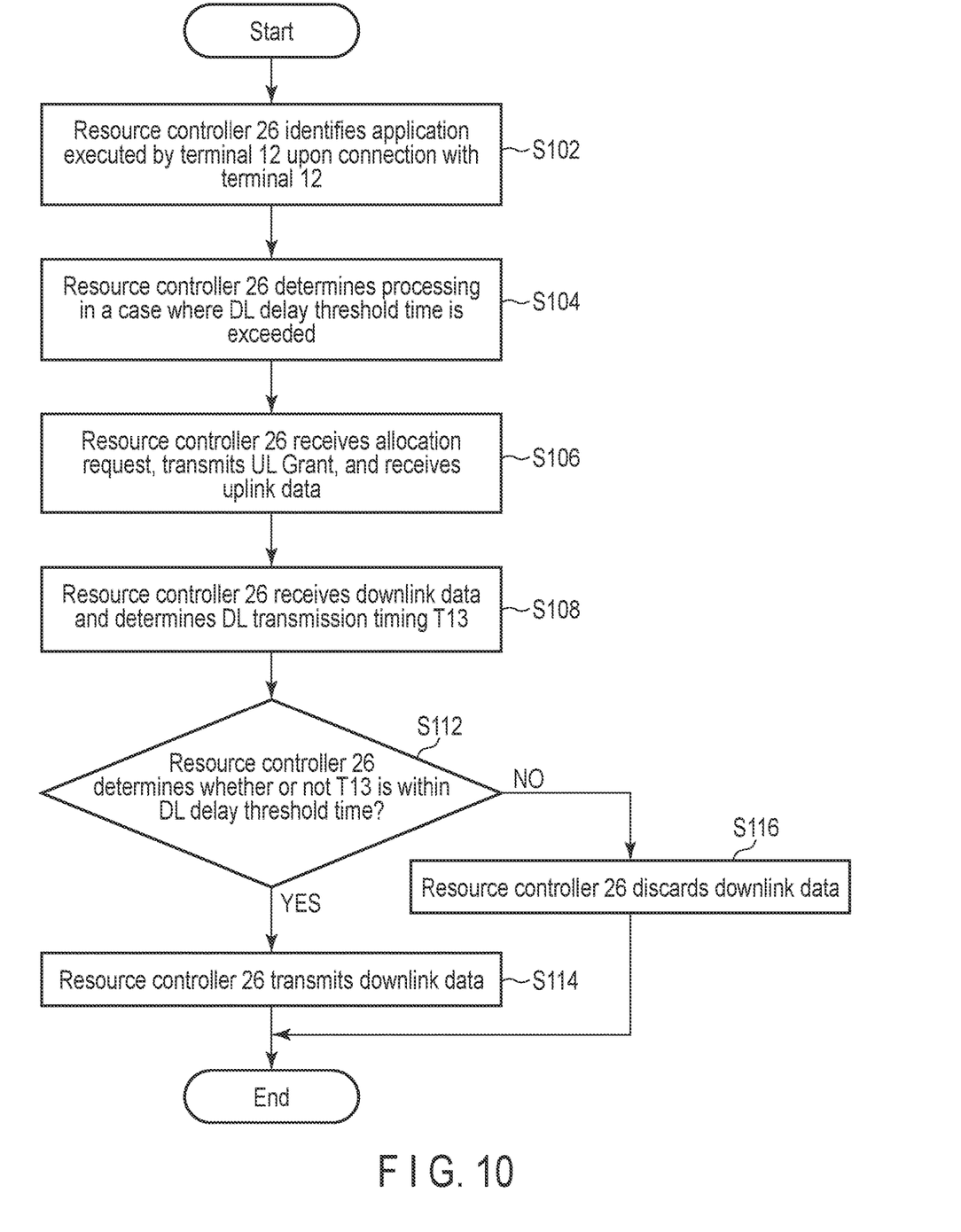
FIG. 10 is a flowchart for describing an example of a processing procedure of a resource controller according to a fourth embodiment.

FIG. 10 is a flowchart for describing an example of a processing procedure of the resource controller 26 according to the fourth embodiment.

When connection with the terminal 12 is established, the resource controller 26 identifies an application executed by the terminal 12 (S102).

The resource controller 26 determines processing in a case where the downlink delay threshold time is exceeded according to the application (S104). Here, it is assumed that the downlink data is discarded when the downlink delay threshold time is exceeded.

The resource controller 26 receives a resource allocation request SR, transmits a resource allocation signal UL Grant, and receives uplink data UL (S106).

The resource controller 26 receives downlink data DL and determines a downlink transmission timing T13 (S108).

At the downlink transmission timing T13, the resource controller 26 determines whether or not the timing T13 is within the downlink delay threshold time, that is, whether or not the timing T13 is after the end timing of the downlink delay threshold time (S112).

When the timing T13 is within the downlink delay threshold time (S112; YES), the resource controller 26 transmits the downlink data DL (S114).

When the timing T13 is not within the downlink delay threshold time (S112; NO), the resource controller 26 discards the downlink data DL (S116).

After S114 or S116, the operation of the resource controller 26 ends.

According to the fourth embodiment, how to handle the downlink data received after the end timing of the delay threshold time can be determined in advance before the downlink transmission timing T13 based on the application executed by the terminal 12. It is possible to effectively use the communication resource by discarding the downlink data based on the type of the application.

Fifth Embodiment

A base station and a communication system according to a fifth embodiment are the same as the base station 10 and the communication system according to the first embodiment illustrated in FIGS. 2A, 2B, and 3, and thus drawings thereof are omitted.

Figure 11:
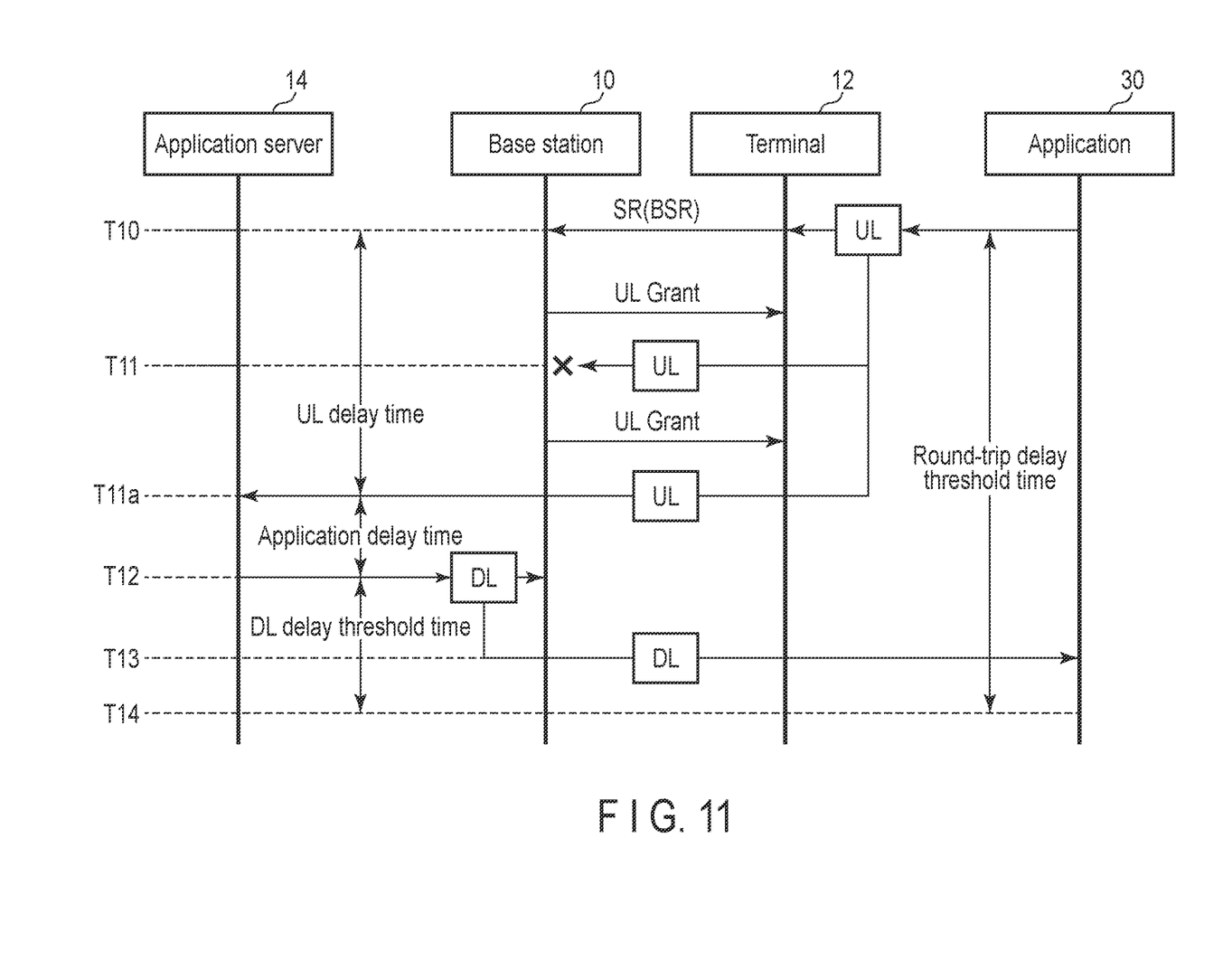
FIG. 11 is a diagram for describing an example of the first round-trip communication according to a fifth embodiment.

FIG. 11 is a diagram for describing an example of the first round-trip communication by the communication system including the base station 10 according to the fifth embodiment.

When the base station 10 detects that an error has occurred in a radio section during the transmission of uplink data UL from the terminal 12 to the base station 10 (the timing T11), the resource controller 26 recalculates the remaining time of the round-trip delay threshold time of all terminals 12 for which the round-trip communication is not completed. The resource controller 26 reallocates the communication resource in order from a terminal 12 having a shorter remaining time, that is, a terminal 12 having a higher uplink communication priority. The resource controller 26 determines again an uplink transmission timing T11a of all the terminals 12 for which the round-trip communication is not completed. The base station 10 transmits a communication resource allocation signal UL Grant including information indicating the updated timing T11a to each terminal 12.

Subsequent operations are the same as those in the first embodiment.

According to the fifth embodiment, the base station 10 reallocates the communication resource to each terminal 12 when an error occurs during the transmission of the uplink data UL after allocating the communication resource to each terminal 12 in response to the communication resource allocation request from the terminal 12. Thereby, even when the retransmission of the uplink data occurs, the uplink data is transmitted within the uplink delay threshold time, and the round-trip communication is also completed within the round-trip delay threshold time.

Sixth Embodiment

A base station and a communication system according to a sixth embodiment are the same as the base station 10 and the communication system according to the first embodiment illustrated in FIGS. 2A, 2B, and 3, and thus drawings thereof are omitted.

Figure 12:
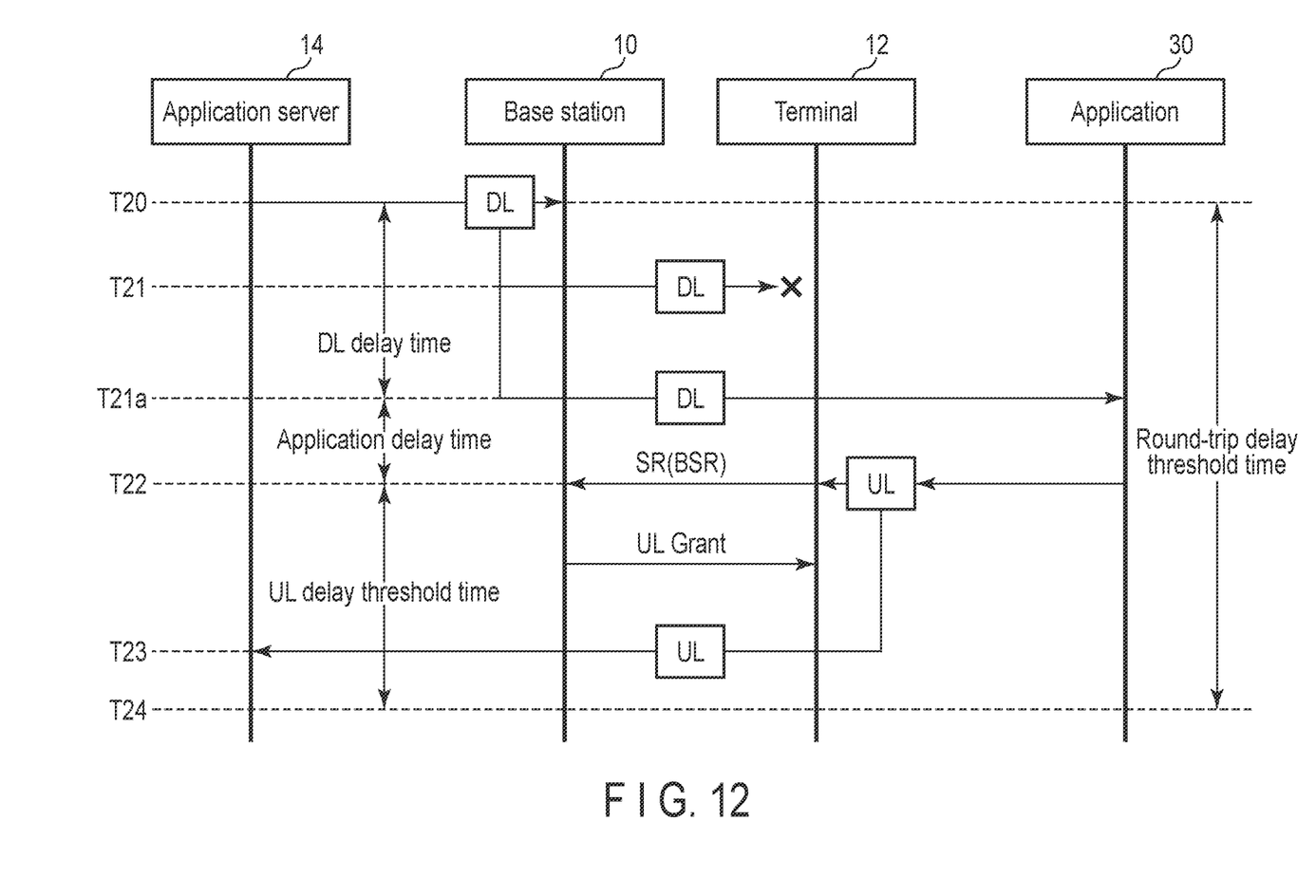
FIG. 12 is a diagram for describing an example of the second round-trip communication according to a sixth embodiment.

FIG. 12 is a diagram for describing an example of the second round-trip communication by the communication system including the base station 10 according to the sixth embodiment.

When the terminal 12 detects that an error has occurred in a radio section during the transmission of downlink data DL from the base station 10 to the terminal 12 (the timing T21), the terminal 12 transmits a retransmission request to the base station 10. The base station 10 retransmits the downlink data DL in response to the retransmission request (a timing T21a).

Subsequent operations are the same as those in the second embodiment.

According to the sixth embodiment, the base station 10 retransmits the downlink data DL when an error occurs during the transmission of the downlink data DL after transmitting the downlink data DL to the terminal 12. Thereby, even when the retransmission of the downlink data DL occurs, the uplink data is transmitted within the uplink delay threshold time, and the round-trip communication is also completed within the round-trip delay threshold time.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A base station comprising:
a communication circuit configured to
   receive uplink data from a terminal,
   transmit the uplink data to a server,
   receive downlink data generated by the server based on the uplink data, and
   transmit the downlink data to the terminal; and
a controller configured to
   calculate a downlink remaining time until an end timing of a downlink delay threshold time based on a first time when the communication circuit receives a communication resource allocation request, a second time when the communication circuit receives the uplink data, a third time when the communication circuit receives the downlink data, and a round-trip delay threshold time, determine a fourth time when the communication circuit will transmit the downlink data to the terminal based on the downlink remaining time, calculate an uplink priority based on the first time and an uplink delay threshold time when the communication circuit receives the communication resource allocation request, and determine the second time based on the uplink priority.

2. The base station of claim 1, wherein the round-trip delay threshold time and the downlink delay threshold time depend on an application executed by the terminal.

3. The base station of claim 1, wherein the uplink delay threshold time depends on an application executed by the terminal.

4. The base station of claim 1, wherein the controller is configured to increase the uplink priority of a terminal having a short uplink remaining time until an end timing of the uplink delay threshold time when the controller receives the communication resource allocation request.

5. The base station of claim 1, wherein the controller is configured to transmit communication resource information designating the second time to the terminal.

6. The base station of claim 1, wherein the controller is configured to preferentially transmit the downlink data to a terminal having a short downlink remaining time.

7. The base station of claim 1, wherein
the controller is configured to
assign a first identifier to first uplink data and first downlink data generated based on the first uplink data, and
assign a second identifier to second uplink data and second downlink data generated based on the second uplink data.

8. The base station of claim 1, wherein the controller is configured to discard the downlink data based on an application executed by the terminal when a difference between the third time and the fourth time exceeds the downlink delay threshold time.

9. A base station comprising:
a communication circuit configured to
receive downlink data from a server,
transmit the downlink data to a terminal,
receive uplink data generated by the terminal based on the downlink data, and
transmit the uplink data to the server; and
a controller configured to
calculate an uplink remaining time until an end timing of an uplink delay threshold time based on a first time when the communication circuit receives the downlink data, a second time when the communication circuit transmits the downlink data to the terminal, a third time when the communication circuit receives a communication resource allocation request, and a round-trip delay threshold time,
determine a fourth time when the communication circuit will transmit the uplink data based on the uplink remaining time,
calculate an uplink priority based on the third time and the uplink delay threshold time when the communication circuit receives the communication resource allocation request, and
determine the fourth time based on the uplink priority.

10. The base station of claim 9, wherein the round-trip delay threshold time and the uplink delay threshold time depend on an application executed by the terminal.

11. The base station of claim 9, wherein the controller is configured to increase an uplink priority of a terminal having a short uplink remaining time when the communication circuit receives the communication resource allocation request.

12. The base station of claim 9, wherein the controller is configured to transmit communication resource information designating the fourth time to the terminal.

13. The base station of claim 9, wherein
the controller is configured to
assign a first identifier to first downlink data and first uplink data generated based on the first downlink data, and
assign a second identifier to second downlink data and second uplink data generated based on the second downlink data.

14. A non-transitory computer-readable storage medium storing computer-executable instructions that, when executed, cause a computer to
receive uplink data from a terminal;
transmit the uplink data to a server;
receive downlink data generated by the server based on the uplink data;
transmit the downlink data to the terminal;
calculate a downlink remaining time until an end timing of a downlink delay threshold time based on a first time when a communication resource allocation request is received, a second time when the uplink data is received, a third time when the downlink data is received, and a round-trip delay threshold time;
determine a fourth time when the downlink data will be transmitted to the terminal based on the downlink remaining time;
calculate an uplink priority based on the first time and an uplink delay threshold time when the communication circuit receives the communication resource allocation request; and
determine the second time based on the uplink priority.

15. A non-transitory computer-readable storage medium storing a computer program that, when executed, causes a computer to
receive downlink data from a server;
transmit the downlink data to a terminal;
receive uplink data generated by the terminal based on the downlink data;
transmit the uplink data to the server;
calculate an uplink remaining time until an end timing of an uplink delay threshold time based on a first time when the downlink data is received, a second time when the downlink data is transmitted to the terminal, a third time when a communication resource allocation request is received, and a round-trip delay threshold time;
determine a fourth time when the uplink data will be transmitted based on the uplink remaining time;
calculate an uplink priority based on the third time and the uplink delay threshold time when the communication circuit receives the communication resource allocation request; and
determine the fourth time based on the uplink priority.

* * * * *